United States Patent
Liu et al.

(10) Patent No.: US 9,431,919 B2
(45) Date of Patent: Aug. 30, 2016

(54) BIOMEDICAL IMPLANT WITH A MONOLITHIC TIMING CONTROL BASED RECTIFIER FOR MULTIVOLTAGE FOR BIOMEDICAL APPLICATIONS

(75) Inventors: Wentai Liu, Los Angeles, CA (US); Yi-Kai Lo, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 580 days.

(21) Appl. No.: 13/984,425

(22) PCT Filed: Feb. 16, 2012

(86) PCT No.: PCT/US2012/025389
§ 371 (c)(1),
(2), (4) Date: Oct. 21, 2013

(87) PCT Pub. No.: WO2012/158226
PCT Pub. Date: Nov. 22, 2012

(65) Prior Publication Data
US 2014/0035370 A1    Feb. 6, 2014

Related U.S. Application Data

(63) Continuation of application No. 61/443,710, filed on Feb. 16, 2011.

(51) Int. Cl.
*H02M 7/155* (2006.01)
*H02M 7/217* (2006.01)
(Continued)

(52) U.S. Cl.
CPC ............... *H02M 7/217* (2013.01); *H02J 1/08* (2013.01); *H02J 17/00* (2013.01); *H02M 1/36* (2013.01);
(Continued)

(58) Field of Classification Search
CPC .. H02M 7/217; H02M 1/36; H02M 3/33561; H02J 1/08; H02J 17/00; H02J 2001/008; H02J 5/005; Y10T 307/406
USPC .......................................................... 307/151
See application file for complete search history.

(56) References Cited

U.S. PATENT DOCUMENTS 8,103,352 B2 *   1/2012   Fried ................... A61N 1/36046
                                                          607/115
8,472,221 B1 *   6/2013   Lee ......................... H02M 7/217
                                                          363/127

(Continued)

OTHER PUBLICATIONS

Chen et al. 2010 in a paper entitled "An Integrated 256-Channel Epiretinal Prosthesis" and published in IEEE J. Solid-State Circuits 5(9) 1946-1956.*
Van Breussegem et al. 2011 in a paper entitled "Monolithic Capacitive DC-DC Converter With Single Boundary—Multiphase Control and Voltage Domain Stacking in 90 nm CMOS" and published in IEEE J. Solid-State Circuit 46(7) 1715-1727.*

(Continued)

*Primary Examiner* — Jared Fureman
*Assistant Examiner* — Michael Warmflash
(74) *Attorney, Agent, or Firm* — O'Banion & Ritchey LLP; John P. O'Banion

(57) ABSTRACT

A biomedical implant is provided for simultaneously generating multiple voltages for digital and analog circuits. Two AC voltages induced from an external single AC source located externally to the biomedical implant are used as input to a multi-voltage rectifier. The multi-voltage rectifier has a rectifier circuitry for simultaneously generating: (i) both low positive and negative voltages and (ii) both high positive and negative voltages. A startup circuitry is designed to stabilize both low positive and negative voltages prior to stabilizing both high positive and negative voltages. A timing control circuitry is used to prevent reverse leakage currents from loading capacitors to input for efficiency enhancement. The biomedical implant, by virtue of the multi-voltage timing control rectifier, achieves high power transfer efficiency greater than 85%.

19 Claims, 8 Drawing Sheets

(51) Int. Cl.
*H02J 17/00* (2006.01)
*H02J 1/08* (2006.01)
*H02M 1/36* (2007.01)
*H02M 3/335* (2006.01)
*H02J 5/00* (2016.01)
*H02J 1/00* (2006.01)

(52) U.S. Cl.
CPC ........... *H02M 3/33561* (2013.01); *H02J 5/005* (2013.01); *H02J 2001/008* (2013.01); *Y10T 307/406* (2015.04)

(56) References Cited

U.S. PATENT DOCUMENTS

| | | | |
|---|---|---|---|
| 2006/0100674 | A1 | 5/2006 | Molin |
| 2006/0129207 | A1 | 6/2006 | Fried et al. |
| 2008/0262570 | A1* | 10/2008 | Greenberg ......... A61N 1/36046 607/54 |
| 2009/0062913 | A1* | 3/2009 | Saggere ................ A61M 35/00 623/6.63 |
| 2012/0161514 | A1* | 6/2012 | Choi ................. H02M 3/33561 307/17 |

OTHER PUBLICATIONS

Korean Intellectual Property Office (KIPO), International Search Report and Written Opinion, PCT International Appln. No. PCT/US2012/025389, issued Nov. 29, 2012 (pp. 1-7), with claims searched (pp. 8-12), counterpart to U.S. Appl. No. 13/984,425 herein.

Ortmanns et al. 2007 in a paper entitled "A 232-Channel Epiretinal Stimulator ASIC" and published in IEEE J. Solid-State Circuits 42(12) 2946-2959.

Lee 2010 in a paper entitled "A timing controlled AC-DC converter for biomedical implants" and published in ISSCC Dig. Tech. Papers, pp. 128-129.

Lange et al. 2011 in a paper entitled "An AC-Powered Optical Receiver Consuming 270mW for Transcutaneous 2Mb/s Data Transfer" and published in ISSCC Dig. Tech. Papers pp. 304-305.

Van Breussegem et al. 2011 in a paper entitled "Monolithic Capacitive 10 DC-DC Converter With Single Boundary—Multiphase Control and Voltage Domain Stacking in 90 nm CMOS" and published in IEEE J. Solid-State Circuit 46(7) 1715-1727.

Mounaim et al. 2011 in a paper entitled "Integrated High-Voltage Inductive Power and Data-Recovery Front End Dedicated to Implantable Devices" and published in IEEE Trans. on Biomedical Circuits and Systems 5(3) 283-291.

* cited by examiner

BIOMEDICAL IMPLANT WITH A MONOLITHIC TIMING CONTROL BASED RECTIFIER FOR MULTIVOLTAGE FOR BIOMEDICAL APPLICATIONS

STATEMENT OF GOVERNMENT SPONSORED SUPPORT

This invention was made with Government support under 0310723 awarded by the National Science Foundation. The Government has certain rights in the invention.

FIELD OF THE INVENTION

The invention relates to implantable devices in biomedical applications. In particular, the invention relates to integrated timing control rectifiers capable of generating multi-voltages in biomedical applications.

BACKGROUND OF THE INVENTION

Inductive power has been a main source to supply biomedical implants, which require a reliable and efficient DC powering scheme. Modern implants rely on mixed-mode designs and inevitably require multi-voltages to optimize the system power. Furthermore, implants are usually operated under physics and regulatory service regulation on tissue absorption (e.g. SAR and field strength), which implies the constraints of frequency, power and size. An example of a conventional solution uses external diodes to produce multi-voltages at the penalty of large foot print, e.g. [1] and [2]. In contrast, integrated solutions have been proposed. Examples include a low-voltage (LV) AC-DC converter [3], rectifier [4], as well as the switched-capacitor converter for multi-voltages using a high frequency clock [5], which is not applicable for most size-limited biomedical implants. A high-voltage (HV) rectifier using HV CMOS is also reported [6] with a deficiency of substrate leakage current and latch-ups.

To generate multi-voltages at a high efficiency for the biomedical implants, such as, but not limited to, retinal prostheses, the present invention advances the art by providing an integrated timing control based rectifier using a multi-well structured CMOS process.

SUMMARY OF THE INVENTION

A biomedical implant, which can also be referred to as a fully integrated biomedical rectifier, is provided for simultaneously generating multiple voltages for digital and analog circuits. Two AC voltages induced from an external single AC source located externally to the biomedical implant are used as input to a multi-voltage rectifier. The multi-voltage rectifier has a rectifier circuitry for simultaneously generating: (i) both low positive and negative voltages and (ii) both high positive and negative voltages.

The low positive and negative voltages are used for powering digital circuits or data circuits and are typically within the range of +/−5V, depending on the minimum required supply voltage for the operation of digital circuits. The high positive and negative voltages are used for powering one or more analog stimulators and are typically within the range of from low voltage outputs to a process breakdown voltage. For a 32V CMOS process at TSMC 0.18 μm, the high positive and negative voltages can be set from +/−2V up-to +/−16V depending on the applications conducted. In one aspect, the high positive and negative voltages are within the range from the low-voltage outputs to up-to +/−16V, respectively.

The multi-voltage rectifier further includes a startup circuitry designed to stabilize both low positive and negative voltages prior to stabilizing both high positive and negative voltages. In one aspect, the startup circuitry has diode-connected transistors for charging and discharging loading capacitors to raise the low positive and negative voltages first and kick off operation of the biomedical implant. In another aspect, the startup circuitry has diode-connected transistors for charging and discharging loading capacitors, while other active control circuits are still off. In still another aspect, the startup circuitry is designed such that the rectifier control circuitry starts working after the rectifier outputs reach the minimum operating voltages. In yet another aspect, the startup circuitry is designed such that low voltages and high voltages outputs of the rectifier are gradually stabilized to power the biomedical implant.

In one embodiment, the multi-voltage rectifier has a timing control circuitry to prevent reverse leakage currents from loading capacitors to AC voltage input for efficiency enhancement.

In another embodiment, a bias circuitry for ensuring the maintenance of a low substrate voltage to prevent a forward parasitic diode current.

In still another embodiment, the biomedical implant is integrated monolithically on a single semiconductor chip.

In still another embodiment, a body ground of a subject is connected to a ground of the biomedical implant.

In still another embodiment, the rectifier circuitry including current charging transistors controlled by their corresponding timing circuitry are configured as switches, and not as diodes.

In still another embodiment, the biomedical implant does not require an external, pre-existing bias, reference voltage.

In still another embodiment, the circuitry scheme to generate both positive and negative voltages reduces the amplitude of the external AC source.

In still another embodiment, the circuitry is designed using bulk and/or SOI CMOS process with single, double, and triple wells.

In yet another embodiment, the multi-voltage timing control rectifier achieves a high power transfer efficiency greater than 85%.

DETAILED DESCRIPTION

Design challenges of the rectifier for implants involve system, circuit, and layout. The biomedical implant has a single external AC signal and must meet with a high compliance voltage of up-to 20VPP due to high electrode impedance. HV transistors enable the realization of high voltage applications, but with more complicated device structures. Clearly in the circuit and layout level, the turn-on of parasitic BJTs/diodes must be prevented such that no substrate leakage current is formed, which degrades the rectifier efficiency and lowers the amplitude of the induced voltages.

Figure 1:
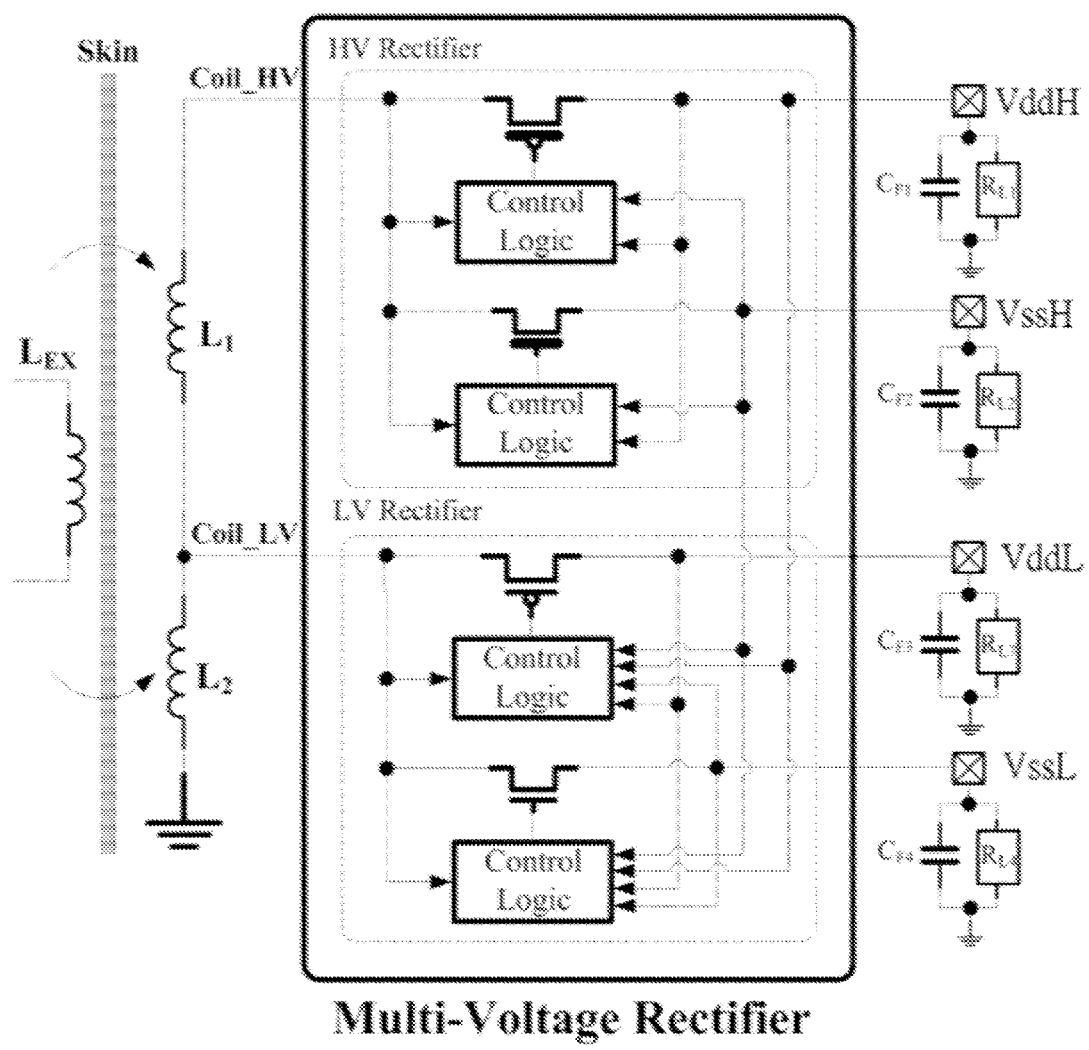
FIG. 1 shows the system architecture according to an exemplary embodiment of the invention (filter capacitors and loads not shown).
Figure 4:
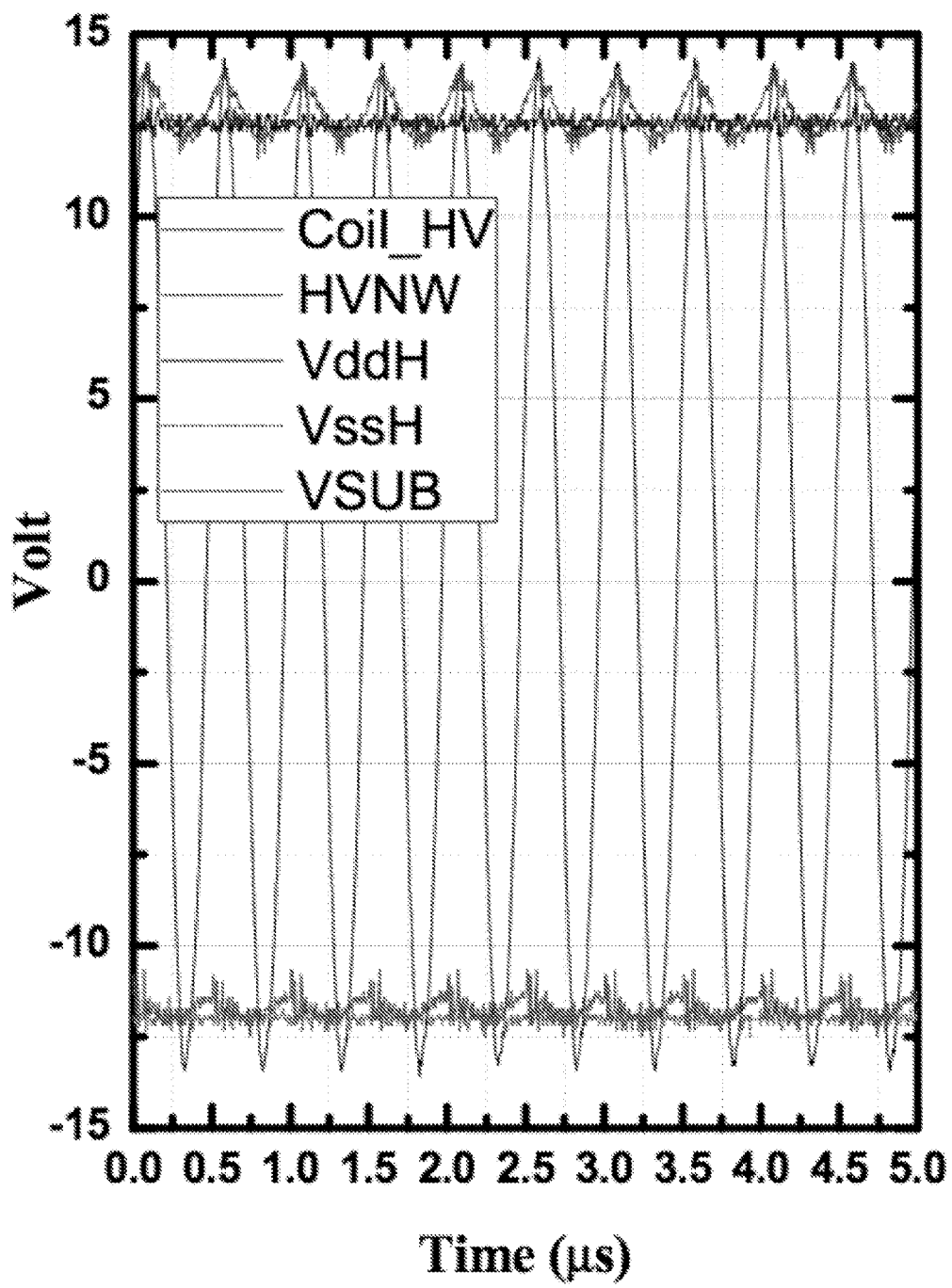
FIGS. 4-5 show according to an exemplary embodiment of the invention measured waveforms of rectifier outputs and corresponding bulk voltages of a HV rectifier at the loading of 48 mW (FIG. 4) and a LV rectifier at the loading of 4.5 mW (FIG. 5). Coil_HV is the signal oscillating with the largest amplitude, VddH is the waveform with the smallest amplitude around +12.5V, HVNW is the waveform oscillating between +12.5V and +14V, VssH is the waveform with the smallest amplitude around −12.5V, and VSUB is the voltage waveform of the chip substrate oscillating between −10V and −12.5V.
Figure 5:
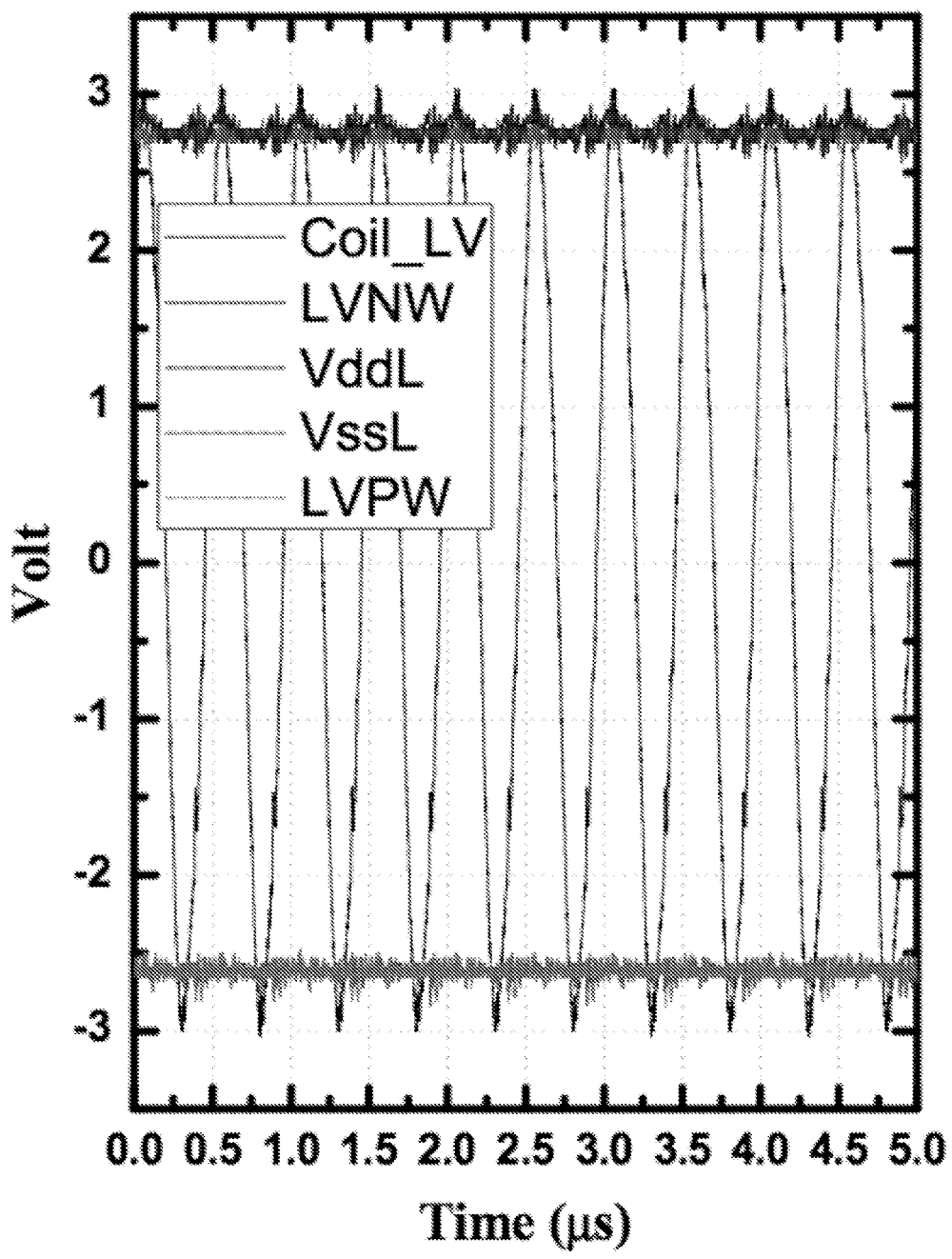

FIG. 1 shows an exemplary rectifier, which utilizes both I/O (5V) and HV (32V) transistors with 0.8V and 1.2V threshold voltage, respectively. Two AC voltages, Coil_HV and Coil_LV, are induced by coils L1 and L2 from the external coil. The rectifier simultaneously generates both low positive and negative voltages of VddL and VssL for digital and data telemetry circuits, as well as both high positive and negative voltages of VddH and VssH for stimulators. Compared to single HV approach [1], the dual-HV scheme according to the present invention reduces the required induced voltage amplitude, which implies 1 smaller coil. In FIG. 1, when Coil_HV is larger than VddH and Coil_LV is larger than VddL, the corresponding control logic turns on the rectifying transistors at a short predefined interval. Similarly the control logic is applied when Coil_HV is smaller than VssH and Coil_LV is smaller than VssL. During this interval, the charge/discharge is carried out for CF1-F4, which drive the loads of RL1-L4. By a precise timing control, the reverse leakage currents are preventable if the rectifying transistors are turned off before the induced voltages drops below VddH and VddL. Similar operations happen when the induced voltages are larger than VssH and VssL as shown in FIGS. 4-5.

Figure 2:
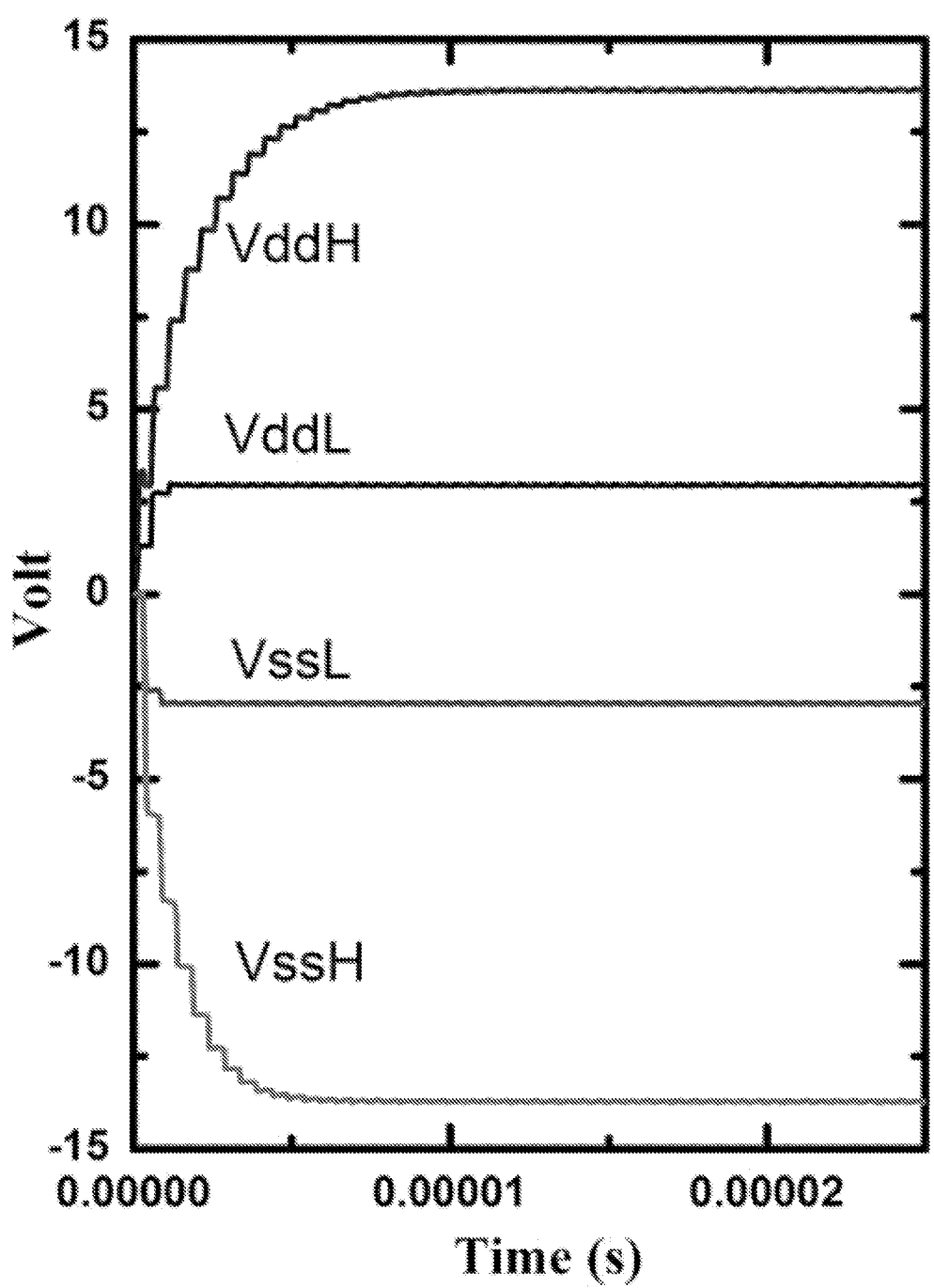
FIG. 2 shows an example of a waveform of a multi-voltage rectifier according to an exemplary embodiment of the invention.

FIG. 2 shows an example of a start-up waveform of the rectifier, in which four output voltages gradually stabilize after inductive powering. Note that LV outputs are intentionally designed to reach the stable values earlier than the HVs. This start-up sequence has advantages of (i) an early-stabilized LVs ensure the proper function of the telemetry and digital circuits before stimulation starts, and/or (ii) enabling the implementation of the control logic of the HV rectifier with LV transistors to save both area and power.

Figure 3A:
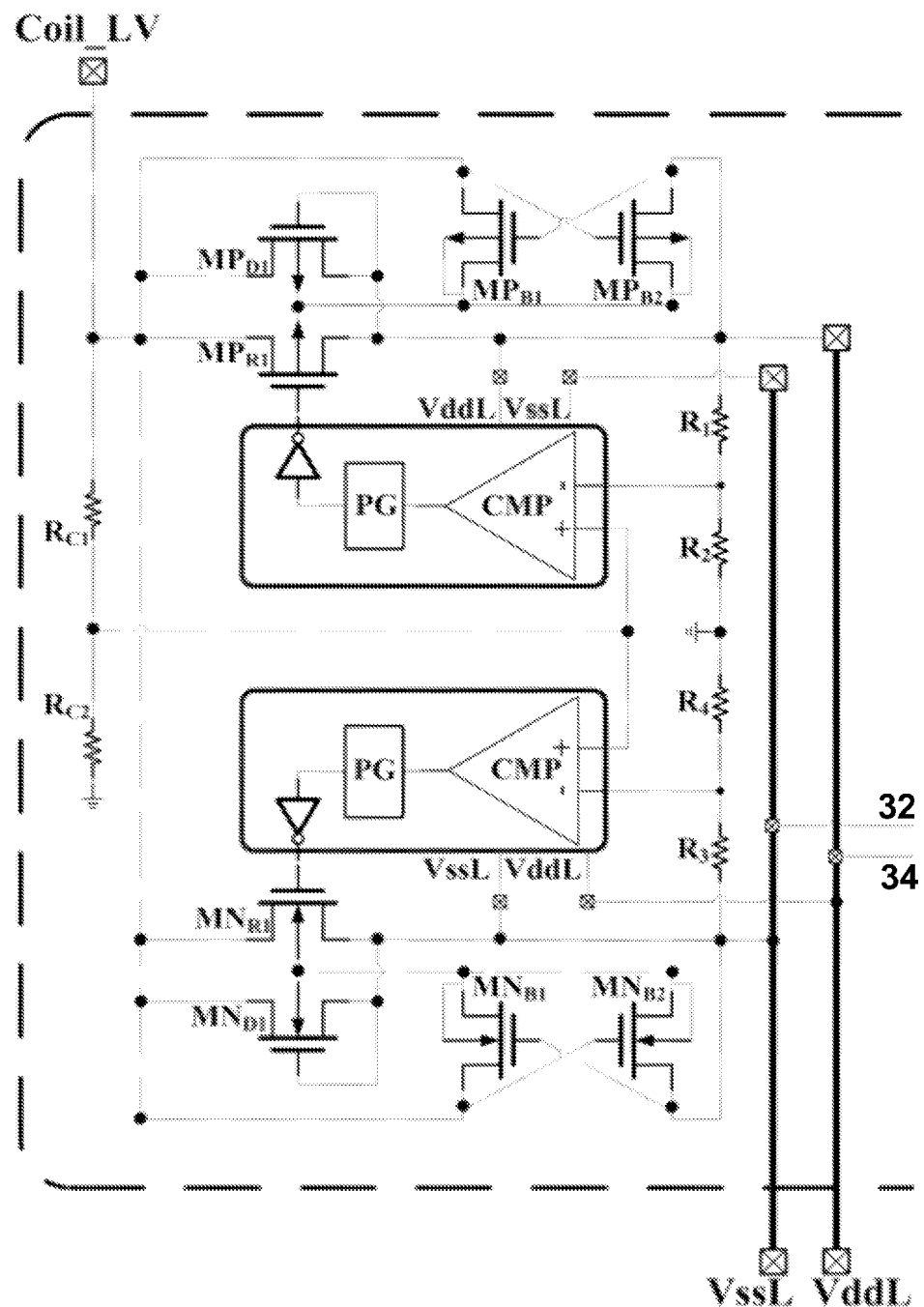
FIGS. 3A-B combined show an example of a circuit diagram of a multi-voltage rectifier according to an exemplary embodiment of the invention. Lines 32 and 34 in the circuits of FIGS. 3A-B connect to each other.
Figure 3B:
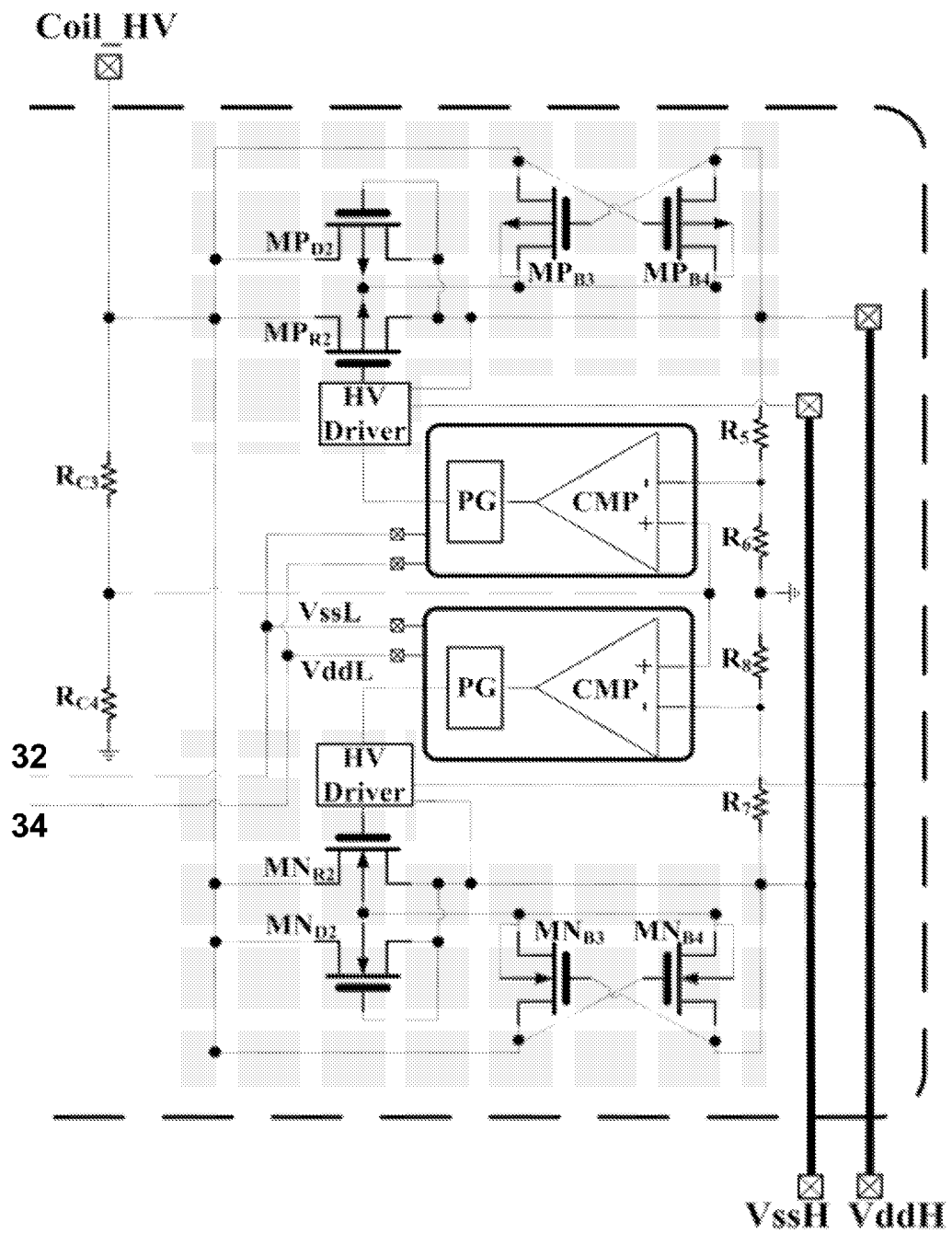

An example circuitry of the rectifier is shown in FIGS. 3A-B, where HV transistors are indicated in the gray area. Transistors of MPR1-R2 and MNR1-R2 are operated as switches driven by their own control circuits. Resistors of RC1-C4 and R1-8 form the dividers to ensure the derived signals of the induced voltages and rectifier outputs are compatible with the common-mode voltage of the comparator CMP. The divider ratios at both inputs of the CMP are chosen to offset the intrinsic delay of the control logic such that the rectifying transistors are on and off at the right moment. Driven by CMPs, the pulse generators (PGs) drive the gate of the rectifying transistors over the short interval. Implemented in isolated n-wells, all the LV circuits are powered by VddL and VssL, while only the HV driver is powered by VddH and VssH. An efficiency enhancement is achieved by applying a large gate voltage, |VddL-VssL| and |VddH-VssH| to the rectifying transistors, since they are operated in triode region. This makes large current driving capability possible with a small device size.

To prevent the leakage current due to the parasitic BJTs, the bulk voltages of MPR1 and MNR1 in its isolated wells are regulated by MPB1-B2 and MNB1-B2 respectively and so do the bulk voltages of MPR2 and MNR2 by MPB3-B4 and MNB3-B4. The bulk of MPR2 must always be kept at the highest voltage available on-chip to prevent the leakage current of the vertical BJT to chip substrate.

In one example the start-up circuit is made of diode-connected transistors, MPD1-D2 and MND1-D2. They are implemented with small size transistors and their main functions are to charge/discharge the loading capacitors while all other active circuits are still off. Despite of the limited current driving ability of MPD1-D2 and MND1-D2, all active circuits (CMP, PG, and HV Driver) start working right after the rectifier outputs reach their minimum operating voltages.

Figure 6:
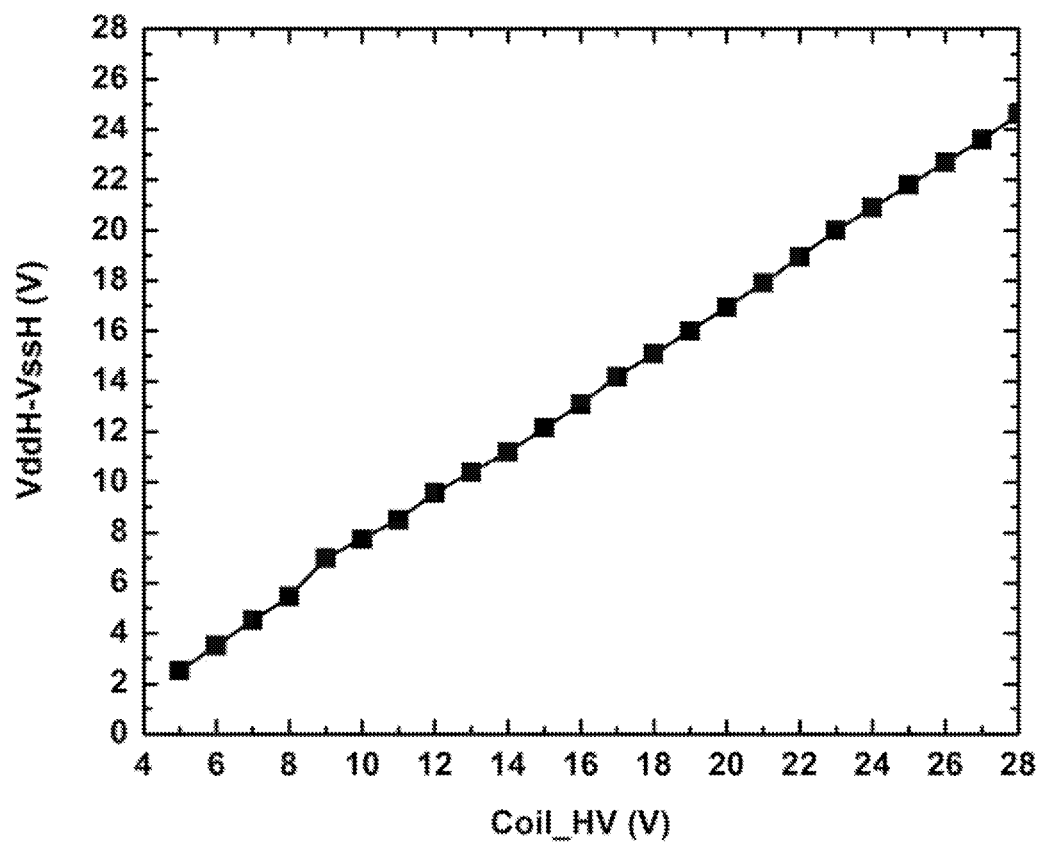
FIG. 6 shows according to an exemplary embodiment of the invention a measured high voltage rectifier output (VddH-VssH) versus the induced peak-to-peak voltages of Coil_HV at 2 mA current loading.

In one example, without any limitations, the rectifier is designed and fabricated with TSMC 0.18 μm HV (32V) CMOS process. The chip microphotography has an active area of 900×650 μm2. HV and LV devices are separated far enough to prevent latch-ups. The rectifier receives the induced voltages, Coil_LV (3Vamp) and Coil_HV (14Vamp), at 2 MHz. The static power of the rectifier is 150 μW. Four external filter capacitors of 100 nF are placed at the rectifier outputs. The output voltages of the rectifier are ±2.4V and ±12.5V at the loading power of 10 mW and 36 mW. For the retina prosthesis, the HV rectifier has an efficiency of 89% at 3 mA current. FIG. 4 shows the measured waveforms of VddL, VssL, LVPW and LVNW (the bulk voltages of MPR1 and MNR1), at the loading of 4.5 mW. The measured results of VddH, VssH, HVNW and VSUB (the bulk voltages of MPR2 and MNR2), at the loading of 48 mW are shown in FIG. 5. FIG. 6 shows the measured results of VddH-VssH versus induced peak-to-peak voltage of Coil_HV under a loading current of 2 mA. Consequently, the rectifier has the flexibility of providing a wide range of compliance voltages and thus it is applicable to various biomedical applications.

Figure 7:
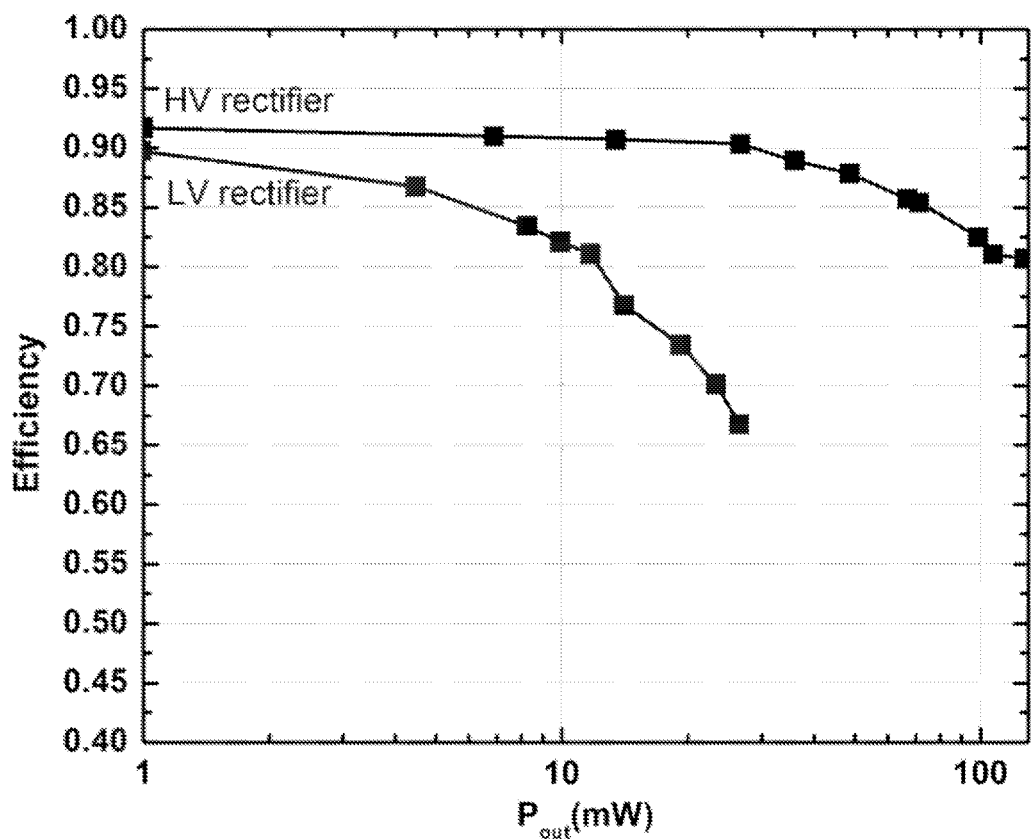
FIG. 7 shows according to an exemplary embodiment of the invention measured efficiency of a rectifier at various loading. The efficiency is defined as peak-to-peak voltages of Coil_LV and Coil_HV versus VddL-VssL and VddH-VssH for LV and HV rectifiers, respectively.

At 2 MHz, FIG. 7 shows the measured rectifier efficiency versus the loading power. An increasing loading current leads to lower efficiency as a result of the increasing drain-to-source voltage of the rectifying transistor. The LV rectifier has an efficiency of 82% with ±2.4V outputs under the loading of 10 mW. HV rectifier has an efficiency >90% when loading <15 mW. At the loading of 127 mW, the efficiency is 80.7%. The working frequency of the rectifier is up-to 6 MHz, but efficiency is degraded if the frequency is increased.

The following table shows a performance comparison with the state-of-the-art works. The rectifier of the present invention is not only capable of providing multiple voltages for digital circuits and analog stimulators, but also has comparable or better performance to prior works.

| | [3]* | [4] | [6] | This work* |
|---|---|---|---|---|
| Technology | 0.35 μm CMOS | 0.18 μm std CMOS | 0.8 μm HV CMOS | 0.18 μm HV CMOS |
| Frequency | 13.56 MHz | 0.2-3.3 MHz | 13.56 MHz | Up-to 6 MHz |
| Induced voltage | 4.4 $V_{pp}$ @13.56 MHz | 3.5 V @1 MHz | 15.29 $V_{pp}$ @13.56 MHz | 6 $V_{pp}$ (LV) 28 $V_{pp}$(HV) @2 MHz |
| Output voltage | 3.5 V | 2.85 V (HV) 1.8 V (LV) | 12.01 V | +2.43 V, −2.43 V +12.0 V, −12.0 V |
| Loading power | 130 μW | 10 mW@2 V | 12.01 mW | 10 mW (LV) 72 mW (HV) |
| Efficiency** LV | 80% | 51.4% | None | 82% |
| Efficiency** HV | None | 81.4% | 78.5% | 85.4%(72 mW) 89%(36 mW) |
| Area | None | 420 × 250 μm² | None | 900 × 650 μm² |

As one of ordinary skill in the art will appreciate, various changes, substitutions, and alterations could be made or otherwise implemented without departing from the principles of the present invention. It is also noted that this application claims priority from U.S. Provisional Application 61/443,710 filed Feb. 16, 2011, which is incorporated herein by reference. Accordingly, the scope of the invention should be determined by the claims and their legal equivalents.

REFERENCES

[1] Ortmanns et al. 2007 in a paper entitled "A 232-Channel Epiretinal Stimulator ASIC" and published in IEEE J. Solid-State Circuits 42(12) 2946-2959.
[2] Chen et al. 2010 in a paper entitled "An Integrated 256-Channel Epiretinal Prosthesis" and published in IEEE J. Solid-State Circuits 5(9) 1946-1956.
[3] Lange et al. 2011 in a paper entitled "An AC-Powered Optical Receiver Consuming 270 mW for Transcutaneous 2 Mb/s Data Transfer" and published in ISSCC Dig. Tech. Papers pp 304-305.
[4] Lee 2010 in a paper entitled "A timing controlled AC-DC converter for biomedical implants" and published in ISSCC Dig. Tech. Papers, pp 128-129.
[5] Van Breussegem et al. 2011 in a paper entitled "Monolithic Capacitive DC-DC Converter With Single Boundary—Multiphase Control and Voltage Domain Stacking in 90 nm CMOS" and published in IEEE J. Solid-State Circuit 46(7) 1715-1727.
[6] Mounaim et al. 2011 in a paper entitled "Integrated High-Voltage Inductive Power and Data-Recovery Front End Dedicated to Implantable Devices" and published in IEEE Trans. on Biomedical Circuits and Systems 5(3) 283-291.

What is claimed is:

1. A biomedical implant for simultaneously generating multiple voltages for digital and analog circuits, said biomedical implant comprising:
    (a) two AC voltages induced from an external single AC source located externally to said biomedical implant;
    (b) a multi-voltage rectifier receiving said two AC voltages and said multi-voltage rectifier comprising a rectifier circuitry for simultaneously generating: (i) both low positive and negative voltages and (ii) both high positive and negative voltages; and
    (c) said multi-voltage rectifier comprising a startup circuit designed to stabilize said both low positive and negative voltages prior to stabilizing said both high positive and negative voltages.

2. The biomedical implant as set forth in claim 1, wherein said low positive and negative voltages are used for powering digital circuits or data circuits.
3. The biomedical implant as set forth in claim 1, wherein said low positive and negative voltages are within the range of +/−5V.
4. The biomedical implant as set forth in claim 1, wherein said high positive and negative voltages are used for powering one or more analog stimulators.
5. The biomedical implant as set forth in claim 1, wherein said high positive and negative voltages are set from low voltage outputs up-to a process breakdown voltage defined by a semiconductor foundry.
6. The biomedical implant as set forth in claim 1, wherein said high positive and negative voltages are up to +/−16V.
7. The biomedical implant as set forth in claim 1, wherein said high positive and negative voltages are within the range from said low-voltages to up-to +/−16V respectively.
8. The biomedical implant as set forth in claim 1, wherein said startup circuitry comprises diode-connected transistors for charging and discharging loading capacitors to generate said low positive and negative voltages first and kick off operation of said biomedical implant.
9. The biomedical implant as set forth in claim 1, wherein said startup circuitry comprises diode-connected transistors for charging and discharging loading capacitors while other active control circuits are still off.
10. The biomedical implant as set forth in claim 1, wherein said rectifier control circuitry starts working after said multi-voltage rectifier voltages reach their minimum operating voltages.
11. The biomedical implant as set forth in claim 1, wherein said low voltages and said high voltages are gradually stabilized to power said biomedical implant.
12. The biomedical implant as set forth in claim 1, wherein said multi-voltage rectifier further comprising a timing control circuitry to prevent reverse leakage currents from loading capacitors to said two AC voltages.
13. The biomedical implant as set forth in claim 1, wherein said biomedical implant is integrated monolithically on a single semiconductor chip.
14. The biomedical implant as set forth in claim 1, wherein a high power transfer efficiency greater than 85% is achieved.
15. The biomedical implant as set forth in claim 1, wherein a body ground is connected to a ground of said biomedical implant.
16. The biomedical implant as set forth in claim 1, further comprising a bias circuitry for ensuring the maintenance of a low substrate voltage to prevent a forward parasitic diode current.

17. The biomedical implant as set forth in claim 1, wherein in said rectifier circuitry, current charging transistors controlled by a corresponding timing circuitry are configured as switches.

18. The biomedical implant as set forth in claim 1, wherein in said rectifier circuitry, current charging transistors controlled by a corresponding timing circuitry are not configured as diodes.

19. The biomedical implant as set forth in claim 1, wherein said biomedical implant does not require an external, pre-existing bias, reference voltage.

* * * * *